July 14, 1942.   L. V. JOHNSON ET AL   2,289,967
HYDRAULIC DESCALER
Filed Aug. 1, 1940   2 Sheets-Sheet 1
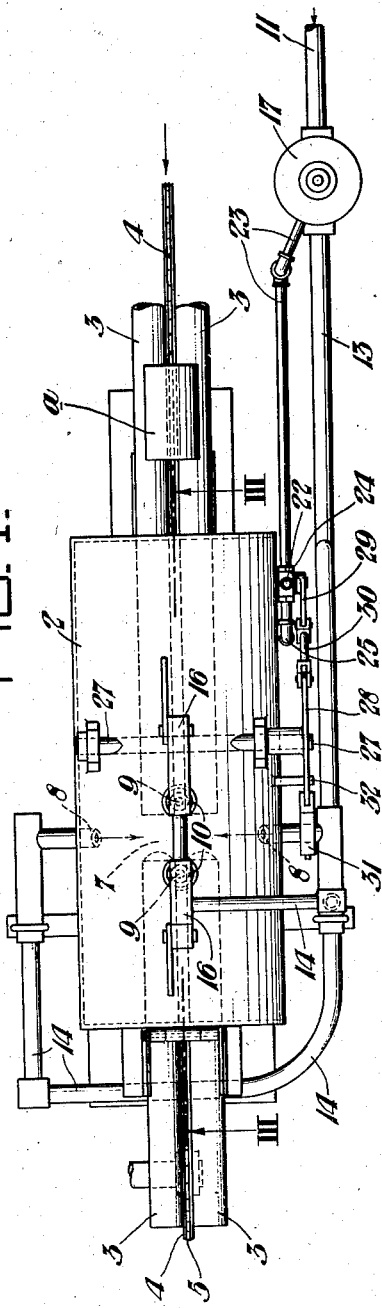
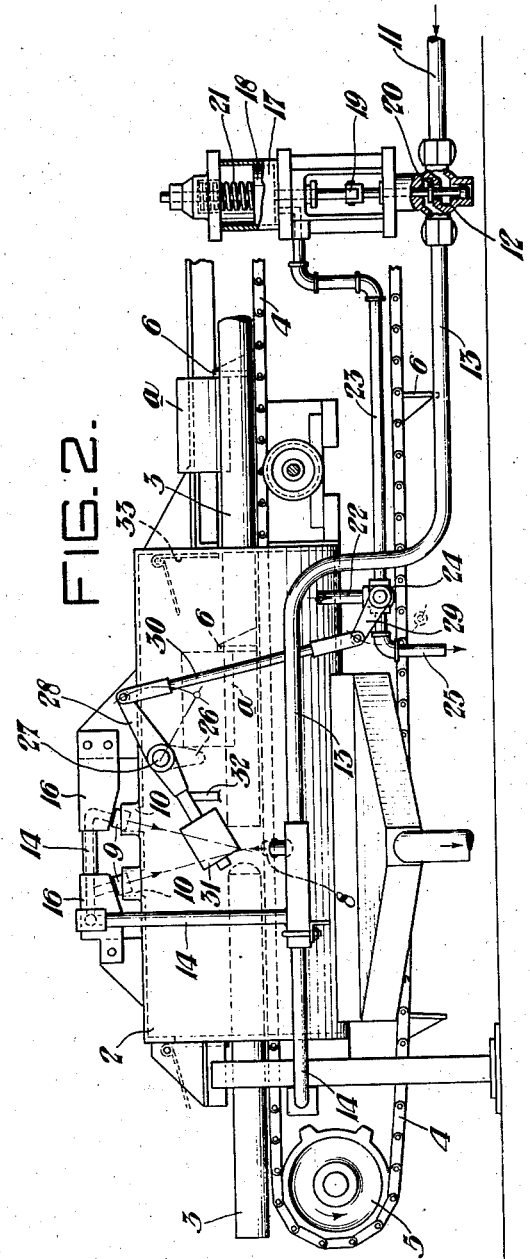
INVENTORS:
LEONARD V. JOHNSON and HENRY E. PASSMORE, Jr.
BY: John E. Jackson
THEIR ATTORNEY.

July 14, 1942.　　L. V. JOHNSON ET AL　　2,289,967
HYDRAULIC DESCALER
Filed Aug. 1, 1940　　2 Sheets-Sheet 2

INVENTORS:
LEONARD V. JOHNSON and HENRY E. PASSMORE, Jr.
BY John E. Jackson
THEIR ATTORNEY.

Patented July 14, 1942

2,289,967

UNITED STATES PATENT OFFICE 2,289,967

HYDRAULIC DESCALER

Leonard V. Johnson, McKeesport, and Henry E. Passmore, Jr., Mount Lebanon, Pa., assignors to National Tube Company, a corporation of New Jersey Application August 1, 1940, Serial No. 349,200

6 Claims. (Cl. 29—81)

This invention relates to improvements in hydraulic descalers for billets and the like.

In the forging of steel, it is essential that the scale be removed from the surface of the heated billet. For example, in the forging of steel cylinders in the manufacture of gas containers or the like, it is necessary that all of the exterior surface of the billet, including the ends thereof, shall be free of scale so as not to interfere with the forging operations or produce defects in the walls or the finished surfaces of the article.

In such manufacture, it is also desired to maintain the billet at a proper temperature for forging, and hence, any descaling treatment thereof must be accomplished quickly and with a minimum reduction in temperature of the billet.

It is an object of our invention to provide a descaler which will completely and quickly remove the scale from a heated billet or the like without materially reducing the temperature thereof.

A further object is to descale such billets or the like through the application of a liquid spray under relatively high pressures, thereby utilizing the force of said spray together with the cooling and contracting of the scale, for complete separation and removal of said scale.

Our invention also has in view to provide a novel arrangement of spray nozzles in relation to the path of the work whereby the entire external surface of the work is subjected to the descaling treatment, including the end surfaces of the work.

The invention further contemplates the automatic control of the hydraulic sprays in relation to the travel of the work, and also provides for the efficient operation of such control for high speed travel or conveyance of the work in relation to said hydraulic spray.

Additional objects and advantages will become apparent from the following description taken in connection with the accompanying drawings wherein:

Fig. 1 is a top plan view of a hydraulic descaler embodying our invention;

Fig. 2 is a side elevational view thereof;

Figure 3:
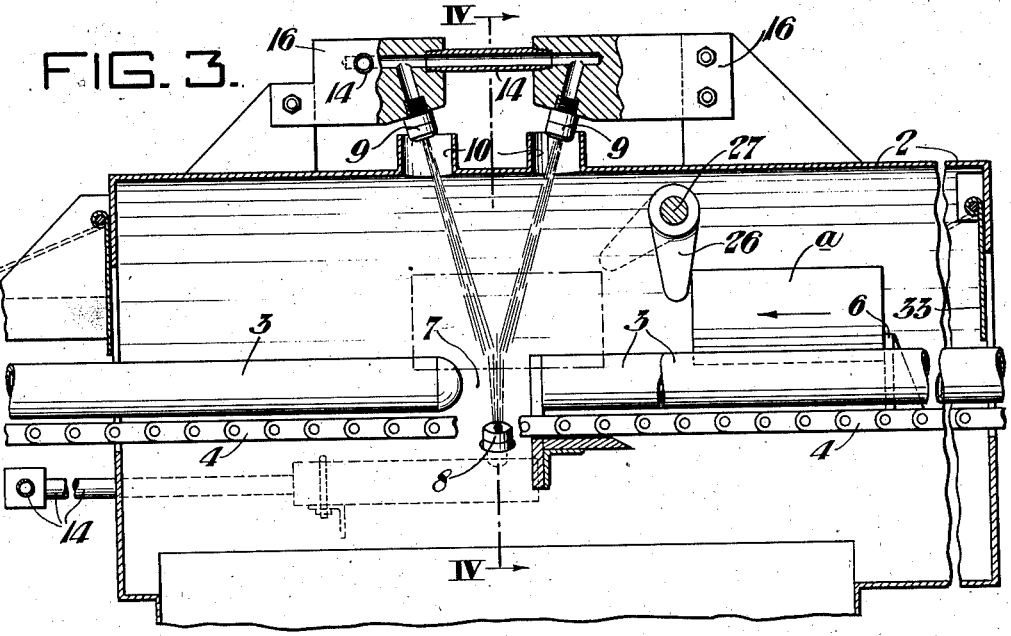
Fig. 3 is an enlarged longitudinal section taken on the line III—III of Fig. 1.

Referring to the drawings, 2 designates the hollow cylindrical casing of the descaler, said casing being mounted and supported horizontally in any suitable manner. A work-supporting and conveying means extends horizontally and longitudinally through the central portion of the casing 2, said means preferably being in the form of a trough or trackway comprising a pair of spaced rails or skids 3. A conveyor chain 4 may be provided for conveying the work on said trackway, having a strand thereof disposed centrally and longitudinally between the rails 3, said chain having a terminal sprocket 5 and being driven in any suitable manner, not shown. Suitable dogs 6 may be provided on the chain 4, said dogs extending upright between the rails 3 for engagement with the work or billet $a$ for sliding and conveying the latter along the trackway.

It will be understood, that the trackway 3 may extend between various points in the mill for conveying the work. For example, in the descaling of billets to be used for forging, the conveyor means may extend from the heating furnace, through the descaler casing 2 and to a hydraulic press or the like.

A plurality of hydraulic spray nozzles are mounted on the casing 2 and extend therein for directing high pressure and high velocity sprays upon the bilelt or work as the same is conveyed within said casing. In order to fully and completely spray the lower surface of the work, the trackway is provided with a transverse gap 7 centrally within the casing 2, and one or more nozzles 8 are disposed to direct their sprays in the plane of said gap so as to engage the lower portion of the work as the same travels over the gap. As preferred, a pair of nozzles 8 is shown disposed laterally on opposite sides of the gap 7, said nozzles being convergently directed inwardly and slightly upwardly toward the path of the work along the trackway.

For the purpose of spraying the upper and end surfaces of the work, we provide a pair of nozzles 9 directed downwardly through provided openings 10 in the upper portion of the casing 2, one of said nozzles being inclined in the direction of movement of the work, and the other of said nozzles being oppositely inclined. The inclination of the nozzles 9 is sufficient to direct their sprays against the vertical end faces or surfaces of the billet or work as the latter is passed beneath said nozzles.

Figure 4:
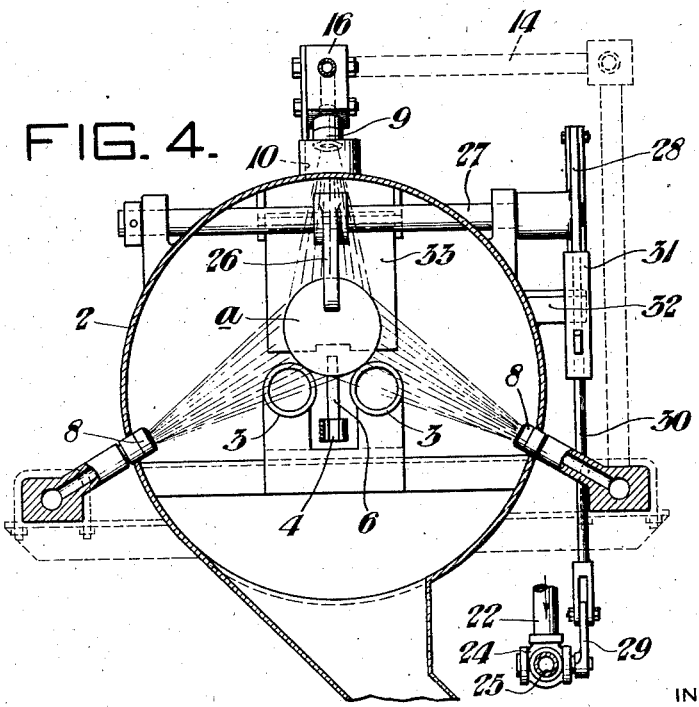
Fig. 4 is a cross section taken on the line IV—IV of Fig. 3.

The nozzles 8 and 9 are preferably provided with orifices emitting fan-shaped or flat-spread sprays, which nozzles are disposed to project their sprays with the lateral spread thereof transversely of the direction of travel of the work. Hence, as particularly shown in Figure 4, the spread of the sprays of the nozzles 8 and 9 completely encompasses the surface of the billet or work, the sprays of the nozzles 9 having a sufficient spread for impinging contact over the entire end surfaces of the work.

As preferred, the sprays of the nozzles 9 converge toward and intersect the transverse plane of the gap 7 in the trackway, which plane also contains the sprays of nozzles 8, whereby the engagement of the sprays with the billet or work is localized for efficient treatment of the work without prolonged contact thereof with the cooling effect of the sprays.

Automatically operable means are provided for supplying liquid to the spray nozzles from a liquid supply line 11, including a hydraulic valve 12 and conduit 13, the latter having individual connection with the nozzles 8 and 9 by branch conduits 14. Suitable nozzle blocks or mounts 16 may be employed, having internal passages communicating with the conduits 14 and their respective nozzles.

17 designates a pneumatic cylinder having its piston 18 connected as at 19 with the closure element or plug 20 of the hydraulic valve 12. The piston 18 is loaded by means of a suitable spring 21 normally urging said piston to a position closing the valve element 20 of hydraulic valve 12. The pneumatic cylinder 17 is connected with a suitable air line 22 through piping 23 and a three-way valve 24, the latter having an exhaust connection 25 to the atmosphere.

For the purpose of controlling the supply of liquid to the series of spray nozzles in relation to the travel of the work or billet $a$ through the descaler, we provide a trigger 26 secured to a transverse shaft 27 pivotally mounted in the casing 2, the trigger 26 being located in advance of the spray nozzles 8 and 9 and normally depending into interfering position with the work as the latter approaches the region of said sprays. A lever 28 is secured to one end of the shaft 27 outside the casing 2 for connection with the actuating handle or arm 29 of the three-way valve 24, as by means of a connecting link 30. Lever 28 is counterweighted as at 31 for normally positioning valve 24 to exhaust cylinder 17 to the atmosphere through outlet 25 and closing the air supply 22 to said valve. 32 designates a stop positioned on the casing 2 defining said position of the counterweighted lever 28, in which position the trigger 26 is disposed in interfering relation with the passage of the work through the descaler device.

In operation, the work or billet $a$ is conveyed along the trackway 3 into the casing 2 through a swinging door 33 and into engagement with the trigger 26, as shown in full lines in Fig. 3. Further travel of the work raises trigger 26 and rotates counterweighted arm 28 to move valve 24 to position admitting air from the supply 22 to the cylinder 17, raising the piston 18 against the spring 21, and opening the hydraulic valve 12 to admit liquid under pressure to the nozzles 8 and 9 through the provided conduits.

As the work passes out of engagement with the trigger 26, the latter is returned to normal position by the counterweighted lever 28, thereby moving valve 24 to close off the air supply 22 and exhaust the cylinder 17 to the atmosphere, whereupon the spring 21 acts to move the piston 18 to close the hydraulic valve 12. By proper correlation of the speed of travel of the work, the space interval between the trigger 26 and the region of the hydraulic sprays, and the closing action of the hydraulic valve, we have found it possible to subject the work to a minimum quantity of liquid for efficient descaling without materially reducing the temperature of the work. Also, due to the spray arrangement and disposition described, a thorough and complete surface treatment of the billet is insured.

The action of the linkage between the trigger 26 and pneumatic valve 24, together with the force of the spring 21 relative to the hydraulic pressure employed, provides a sufficient lag or delay permitting the work $a$ to pass entirely through the zone of the sprays before the hydraulic valve 12 actually shuts off the liquid supply.

In practice, we have obtained highly satisfactory results through conveying the work or billet at a speed of between 1 to 4 feet per second, with a liquid supply for the nozzles in excess of 250 pounds per square inch.

Thus, it will be seen that we have provided a hydraulic descaler capable of rapid, efficient scale removal, whereby the work may be descaled without a detrimental reduction in temperature, enabling the billets or the like to be worked without additional heating. Further, the automatic control of the descaler has sufficient sensitivity to enable proper timing for production purposes at high speeds.

Various changes and modifications are contemplated within the scope of the following claims.

We claim:

1. In a hydraulic descaler for billets or the like, means including laterally spaced rails for supporting the work therebetween, means for conveying the work longitudinally along said rails, said rails having a gap transversely of the direction of the travel of the work thereon, and spray nozzles disposed for impingement of their sprays upon the work as it is conveyed along the support, including a nozzle disposed for impingement of its spray upon that portion of the work normally in contact with a rail, said spray impinging upon the work in the plane of said gap in the rails.

2. In a hydraulic descaler for billets or the like, means for supporting the work, means for conveying the work on said support, and spray nozzles disposed for impingement of the sprays upon the work as it is conveyed along the support, said nozzles being convergently directed toward the path of the work along the support for impingement of their sprays upon opposite transverse end faces of the work.

3. In a hydraulic descaler for billets or the like, means for supporting the work, means for conveying the work on said support, said support having a gap transversely of the direction of the travel of the work thereon, and spray nozzles disposed for impingement of their sprays upon the work as it is conveyed along the support, at least one of said nozzles disposed for impingement of its spray upon the lower portion of the work in the plane of said gap in the support, and a pair of said nozzles convergently directed toward the path of the work for impingement of their sprays upon opposite transverse end faces of the work.

4. In a hydraulic descaler, a hollow casing, work-supporting means extending longitudinally through the casing, means for conveying the work on the supporting means, the latter having a transverse gap located within the casing, spray nozzles disposed for impingement of their sprays upon the work in the plane of the gap as said work is conveyed along the supporting means within the casing, a spray nozzle disposed for discharge of its spray in the direction of movement of the work for impingement thereof upon the rear end face of the work, means connecting said nozzles with a source of liquid supply including a valve, pneumatically operable means for opening said liquid valve including a control valve, a trigger responsive to the travel of the work, means connecting said trigger and control valve to actuate the pneumatic means while the work engages the trigger, means for closing the control valve upon disengagement of the work and trigger, and means associated with said pneumatic means for closing the liquid valve upon said disengagement of the work and trigger.

5. In a hydraulic descaler for billets or the like, means for supporting the work, means for conveying the work on said support, said support having a gap transversely of the direction of the travel of the work thereon, and spray nozzles disposed for impingement of their sprays upon the work as it is conveyed along the support, at least one of said nozzles disposed for impingement of its spray upon the lower portion of the work in the plane of said gap in the support, a pair of said nozzles convergently and oppositely directed toward the direction of travel of the work for impingement of their sprays upon opposite transverse end faces of the work, means connecting said nozzles with a source of liquid supply including a valve, pneumatically operable means for opening said liquid valve including a control valve, a trigger responsive to the travel of the work, means connecting said trigger and control valve to actuate the pneumatic means while the work engages the trigger, means for closing the control valve upon disengagement of the work and trigger, and means associated with said pneumatic means for closing the liquid valve upon said disengagement of the work and trigger.

6. In a hydraulic descaler for billets and the like, a trackway for the work having a transverse gap therein, means for conveying the work on the trackway, a spray nozzle disposed for discharge of its spray in the plane of said gap toward the path of the work, a pair of nozzles directed toward the path of the work, one of said pair being inclined toward the direction of travel of the work and the other being oppositely inclined, means connecting said nozzles with a source of liquid supply including a valve, pneumatically operable means for opening said liquid valve including a control valve, a trigger positioned in advance of said nozzles and responsive to the travel of the work, means connecting said trigger and control valve to actuate the pneumatic means while the work engages the trigger, means for closing the control valve upon disengagement of the work and trigger, and means associated with the pneumatic means for closing the liquid valve upon said disengagement of the work and trigger, said valve closing means having a delayed action in relation to the travel of the work to permit the spray of the nozzle inclined toward the direction of travel of the work to impinge upon the rear end of the work before closing said liquid valve.

LEONARD V. JOHNSON.
HENRY E. PASSMORE, JR.